(12) United States Patent
Lin et al.

(10) Patent No.: US 12,332,560 B2
(45) Date of Patent: Jun. 17, 2025

(54) INFORMATION HANDLING SYSTEM CAMERA SHUTTER WITH SEMI-AUTOMATIC ACTION

(71) Applicant: Dell Products L.P., Round Rock, TX (US)

(72) Inventors: Wen-Hsing Lin, Taipei (TW); Chun-Po Chen, Taipei (TW); Kuan-Hua Chiou, New Taipei (TW); Ming-Chen Chang, Austin, TX (US); Ernesto Ramirez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 18/370,025

(22) Filed: Sep. 19, 2023

(65) Prior Publication Data

US 2025/0093744 A1    Mar. 20, 2025

(51) Int. Cl.
  *G03B 9/36*  (2021.01)
  *G03B 29/00*  (2021.01)

(52) U.S. Cl.
  CPC .............. *G03B 9/36* (2013.01); *G03B 29/00* (2013.01)

(58) Field of Classification Search
  CPC ........... G03B 11/04; G03B 29/00; G03B 9/36
  See application file for complete search history.

(56) References Cited

U.S. PATENT DOCUMENTS

| | | | |
|---|---|---|---|
| 6,247,855 B1 * | 6/2001 | Motohashi | G03B 17/02 396/448 |
| 7,581,893 B2 * | 9/2009 | Miramontes | G03B 17/00 455/575.1 |
| 8,896,754 B2 | 11/2014 | Mundt et al. | |
| 10,133,154 B1 | 11/2018 | Freeze | |
| 11,089,196 B1 | 8/2021 | Hampton et al. | |
| 11,240,438 B1 | 2/2022 | Justin et al. | |
| 2021/0365671 A1 | 11/2021 | Jiang et al. | |

* cited by examiner

*Primary Examiner* — Minh Q Phan
(74) *Attorney, Agent, or Firm* — Zagorin Cave LLP; Robert W. Holland

(57) ABSTRACT

An information handling system includes a camera in a portable housing, the camera selectively blocked and exposed by a camera shutter having a biasing device with a semiautomatic open and close response generating by biasing the shutter towards the closed position when the shutter is greater than a predetermined amount closed and biasing the shutter towards the open position when the shutter is greater than a predetermined amount open. The dual bias is generated with a torsion spring captured between a fixed portion and a sliding portion that interacts with an extension from the fixed portion and an extension from the sliding portion based upon the shutter position.

14 Claims, 7 Drawing Sheets

INFORMATION HANDLING SYSTEM CAMERA SHUTTER WITH SEMI-AUTOMATIC ACTION

BACKGROUND OF THE INVENTION

Field of the Invention

The present invention relates in general to the field of portable information handling system cameras, and more particularly to an information handling system camera shutter with semi-automatic action.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Often end users rely on portable information handling systems as communication tools, such as through Internet written and audiovisual communications. End users often prefer to communicate with a video conference that uses an integrated camera to capture a visual image of the end user and communicate the visual image as a video stream through the Internet to other videoconference participants. In convertible information handling systems, the camera is typically integrated in the housing lid portion so that the end user visual image is captured when the end user views the display. Tablet information handling systems also typically include the camera at a front side with the display and sometimes include a camera at a rear side so the system can be used as a camera. One difficulty associated with integrated cameras is that malicious attackers can access the cameras and capture visual images of the end user without the knowledge of the end user.

To protect a portable information handling system camera from malicious access, the camera is sometimes equipped with a shutter that covers the camera aperture when the camera is not in use. The shutter blocks the camera from capturing visual images and also provides the end user with definitive visual confirmation that the camera is not able to capture visual images. In some instances, the camera shutter has an actuator that opens when camera use is authorized and closes when the camera is inactive. In other instances, the camera is actuated manually by an end user push on the shutter to move the shutter between the open and closed positions. Generally, shutter movement provides a variable feedback to the end user when the shutter reaches a secured open or secured closed position based upon the type of arrangement used to maintain the open or closed position. For example, one common design is to include an elastic feature in the shutter that overcomes an increased force when engaged in the open or closed position. A difficulty with this approach is that the elastic stop tends to wear over time so that an end user lacks meaningful feedback of whether or not the shutter is fully secured open or closed.

SUMMARY OF THE INVENTION

Therefore, a need has arisen for a system and method which secures an information handling system camera shutter in open and closed positions.

In accordance with the present invention, a system and method are provided which substantially reduce the disadvantages and problems associated with previous methods and systems for securing an information handling system camera with a shutter to prevent malicious use of the camera. A dual bias device coupled to the shutter biases the shutter to the open position when the shutter is greater than a predetermined amount open and biases the shutter to a closed position when the shutter is greater than a predetermined amount closed.

More specifically, a portable information handling system includes a camera in a portable housing with a shutter aligned to selectively block and expose an aperture of the camera. The camera shutter has a shutter plate that slides in front of the camera to block capture of visual images and slides to a side position that exposes the camera when capture of visual images is authorized. A biasing device interfaces with the shutter plate to provide a dual bias based upon the camera shutter position. When an end user pushes the shutter plate from an open position towards a closed position, a torsion spring in the biasing device builds tension until a predetermined amount of the closed position is achieved, at which point the tension is applied to bias the shutter plate closed. Similarly, when an end user pushes the shutter plate from the closed position towards an open position, the torsion spring builds tension until a predetermined amount of the open position is achieved, at which point the tension is applied to bias the shutter open. The move to the open and closed position once tension is released from the torsion spring provides a snap that offers the end user with a definitive feedback that the shutter is fully open or closed.

The present invention provides a number of important technical advantages. One example of an important technical advantage is that an information handling system shutter position is affirmatively achieved with a snap that lets an end user know that an open or closed position is reached. High quality and low tolerance assembly offers a consistent experience for the end user with each interaction plus a robust assembly that lasts through an information handling system life.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A dual bias shutter semiautomatically moves to fully closed and fully opened positions at an information handling system camera. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
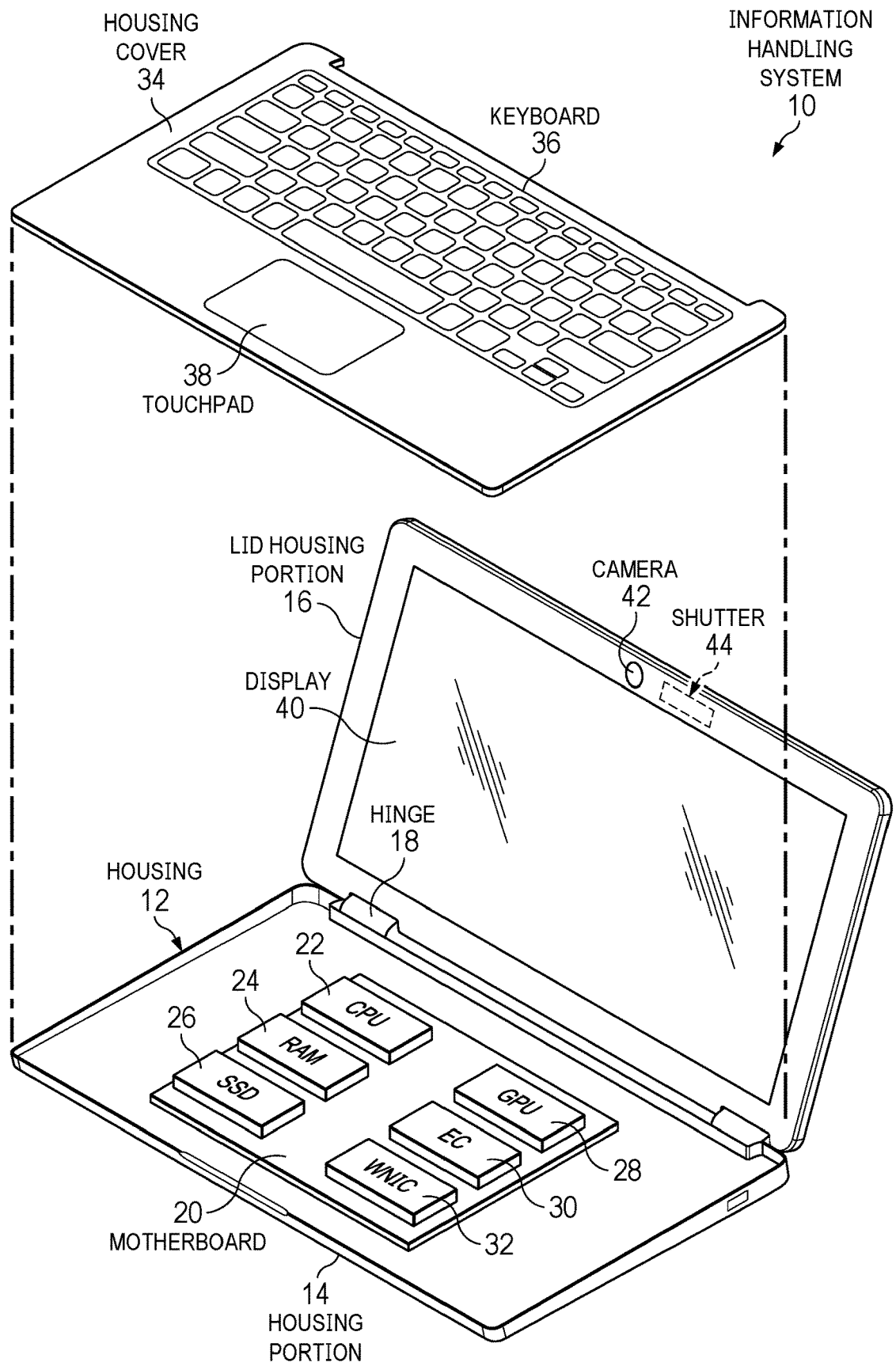
FIG. 1 depicts an exploded perspective view of an information handling system having a camera selectively blocked and exposed by a dual bias shutter.

Referring now to FIG. 1, an exploded perspective view depicts an information handling system 10 having a camera 42 selectively blocked and exposed by a dual bias shutter 44. Information handling system 10 is built in a portable housing 12 having a main housing portion 14 rotationally coupled to a lid portion 16 by a hinge 18. Main housing portion 14 contains a motherboard 20 that couples to and interfaces processing components that cooperate to process information. In the example embodiment, a central processing unit (CPU) 22 executes instructions to process information in cooperation with a random access memory (RAM) 24 that stores the instructions and information. A solid state drive (SSD) 26 has persistent storage, just a flash memory, that stores information during power down of the system, such as an operating system and applications retrieved to CPU 22 at power up of the system by an embedded controller 30. Embedded controller 30 manages physical interactions of the system, such as power application and thermal constraint management. A graphics processing unit (GPU) 28 further processes information to generate visual images for presentation at a display 40, such as by defining pixel values communicated to display 40. A wireless network interface controller (WNIC) 32 provides communication with external devices, such as a wireless local area network and wireless peripherals. A housing cover 34 couples over main housing portion 14 and supports a keyboard 36 and touchpad 38 that accept end user inputs to the system. In various embodiments, other types of configurations of information handling system 10 may be used, such as a tablet information handling system built into a planar housing.

In the example embodiment, a camera 42 couples to lid housing portion 16 at a top side aligned to capture a visual image of an end user viewing display 40. Camera 42 is placed to capture visual images in support of a videoconference and has a shutter 44 that selectively blocks and exposes camera 42 to provide security to an end user against a malicious use of camera 42. When an end user authorizes camera use, the end user moves shutter 44 to expose the camera and permit capture of visual images. When the end user does not authorize use of camera 42, the end user slides shutter 44 over camera 42 to block capture of visual images. Shutter 44 is equipped with a dual bias device, as is explained in greater depth below, that biases shutter 44 towards an open position when the shutter is greater than a predetermined amount open and biases shutter 44 towards a closed position when the shutter is greater than a predetermined amount closed. The resulting end user experience is that the end user will always find the shutter fully open or fully closed. When the end user manually pushes the shutter from the fully open or fully closed position, the dual bias will snap the shutter in the direction of the end user push when the end user reaches a predetermined amount of shutter movement. This provides affirmative feedback to the end user of the shutter position.

Figure 2:
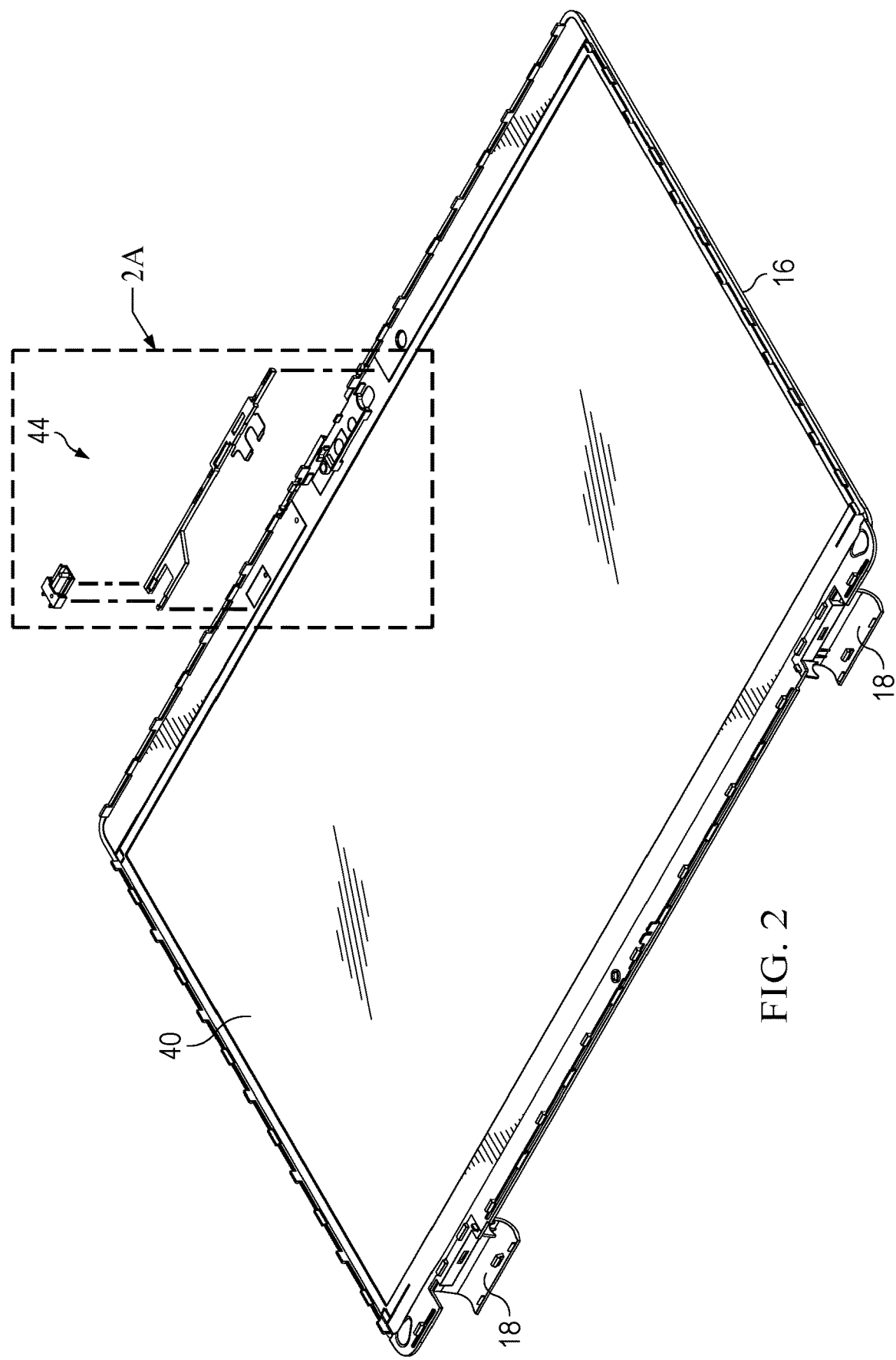
FIGS. 2 and 2A depict an exploded view of a dual bias shutter coupled to a lid housing portion to selectively block and expose a camera.
Figure 2A:
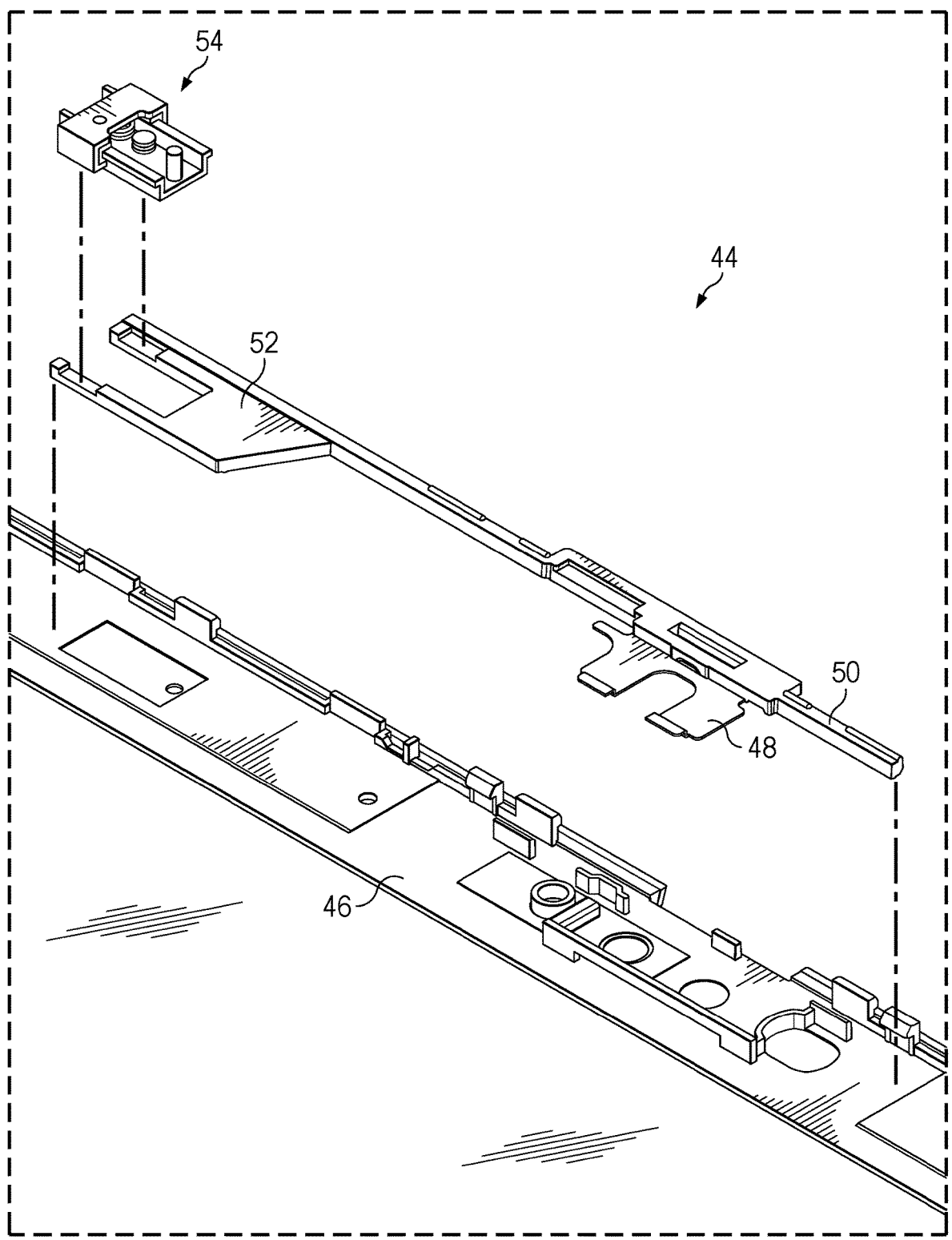

Referring now to FIGS. 2 and 2A, an exploded view depicts a dual bias shutter 44 coupled to a lid housing portion to selectively block and expose a camera. FIG. 2 depicts shutter 44 exploded up from a position at a top side of lid housing portion 16 having hinges 18 to couple to a main housing portion and a display 40. In alternative embodiments, the shutter may couple to a tablet planar housing with a similar arrangement. FIG. 2A depicts a detailed view of shutter 44 having an arm 50 coupled to a shutter plate 48 that fits in a bezel 46 of the lid housing portion. Arm 50 terminates distal the shutter plate 48 with a receptacle 52 that couples to a biasing device 54. Biasing device 54 works through receptacle 52 and arm 50 to slide shutter plate 48 within bezel 46. Biasing device 54 adds a position bias to arm 50 that biases shutter plate 48 to be either fully open or fully closed. When an end user manually moves shutter plate 48 from a fully closed or fully opened position by more than a predetermined amount, biasing device 54 reverses the applied bias to complete the movement of shutter plate 48 in the direction of movement initiated by the end user.

Figure 3A:
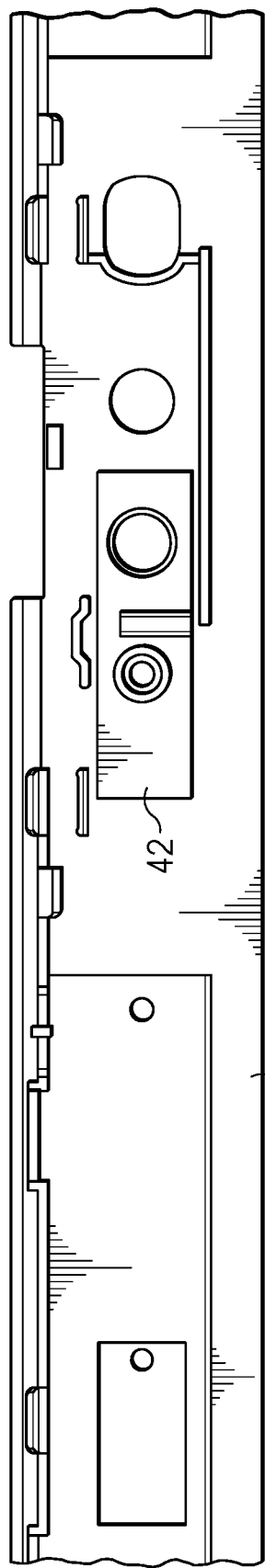
FIGS. 3A, 3B and 3C depict assembly of a dual bias shutter in a modular fashion to couple to an information handling system housing at a camera.
Figure 3B:
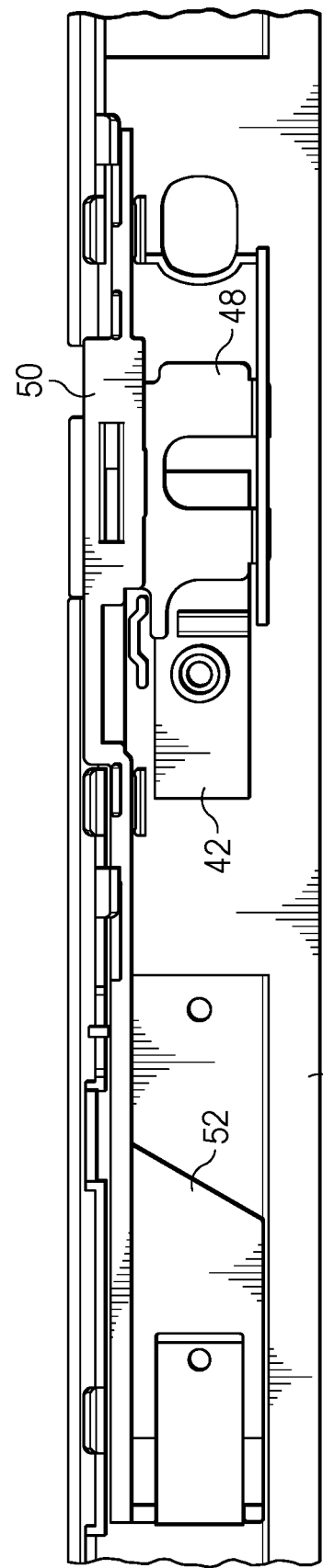
Figure 3C:
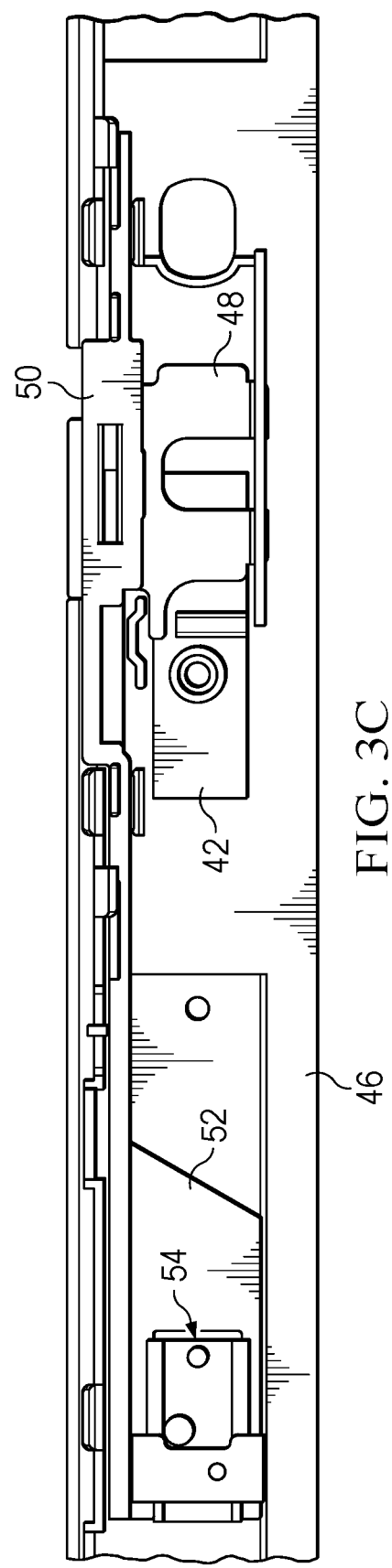

Referring now to FIGS. 3A, 3B and 3C, assembly of a dual bias shutter in a modular fashion is depicted to couple to an information handling system bezel 46 at a camera 42. FIG. 3A depicts camera 42 coupled to bezel 46 and aligned to capture visual images through bezel 46. FIG. 3B depicts shutter arm 50 and shutter plate 48 fit into the form of bezel 46 to slide relative to camera 42. Receptacle 52 has a guide area formed within bezel 46 to slide arm 50 and translate bias from the biasing device 54 to shutter plate 48. The shutter assembly of shutter plate 48, arm 50 and receptacle 52 has a modular configuration for ease of assembly onto bezel 46. FIG. 3C depicts biasing device 54 coupled as a modular unit to a fixed position on bezel 46 and engaged with receptacle 52. An upper sliding portion of biasing device 54 couples to receptacle 52 and provides biasing movement to receptacle 52 relative to a fixed lower portion of biasing device 54 that couples in a fixed manner to bezel 46, as is set forth in greater detail below.

Figure 4:
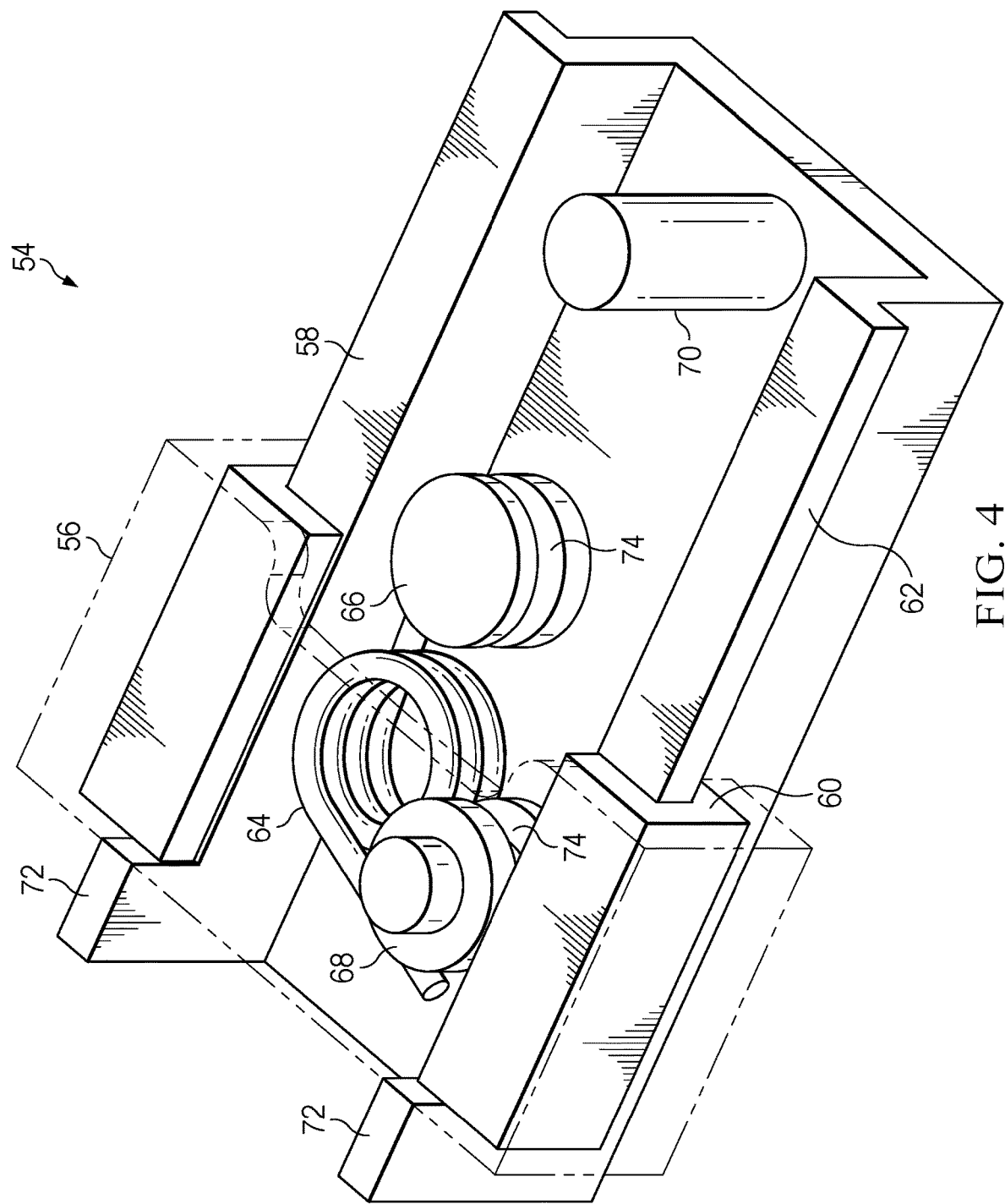
FIG. 4 depicts a detailed see-through perspective view of a dual bias device that biases a camera shutter to both a closed position and an open position with a single torsion spring.

Referring now to FIG. 4, a detailed see-through perspective view depicts a dual bias device that biases a camera shutter to both a closed position and an open position with a single torsion spring. Biasing device 54 has a sliding portion 56 slidingly coupled to a fixed portion 58 with opposing rails 62 on opposing sides of fixed portion 58 engaging opposing guides 60 of sliding portion 56. In one embodiment, sliding portion 56 is made at least in part of polyoxymethylene, such as a coating of Acetal, that provides a robust construction and aids in a sliding movement relative to fixed portion 58. A single torsion spring 64 is captured in a central open area between sliding portion 56 and fixed portion 58, such as stainless steel torsion spring. Tension is maintained on torsion spring 64 by engagement of the opposing extended ends of the torsion spring with the inner walls of fixed portion 58, a fixed member 66 coupled to fixed portion 58 and a sliding member 68 fixed to sliding portion 56. Both fixed portion member 66 and sliding portion member 68 have a slot 74 that accepts the opposing ends of torsion spring 64 to maintain its alignment. A sliding limit 72 formed at one end of fixed portion 58 limits motion of sliding portion 56 in a first direction and a sliding limit post 70 coupled to fixed portion 58 at an opposite end limits sliding portion movement in the opposite direction. Interactions of the walls of the inner cavity that capture torsion spring 64 and the fixed member and sliding member defines the direction in which torsion spring tension operates to bias sliding portion 56.

Figure 5:
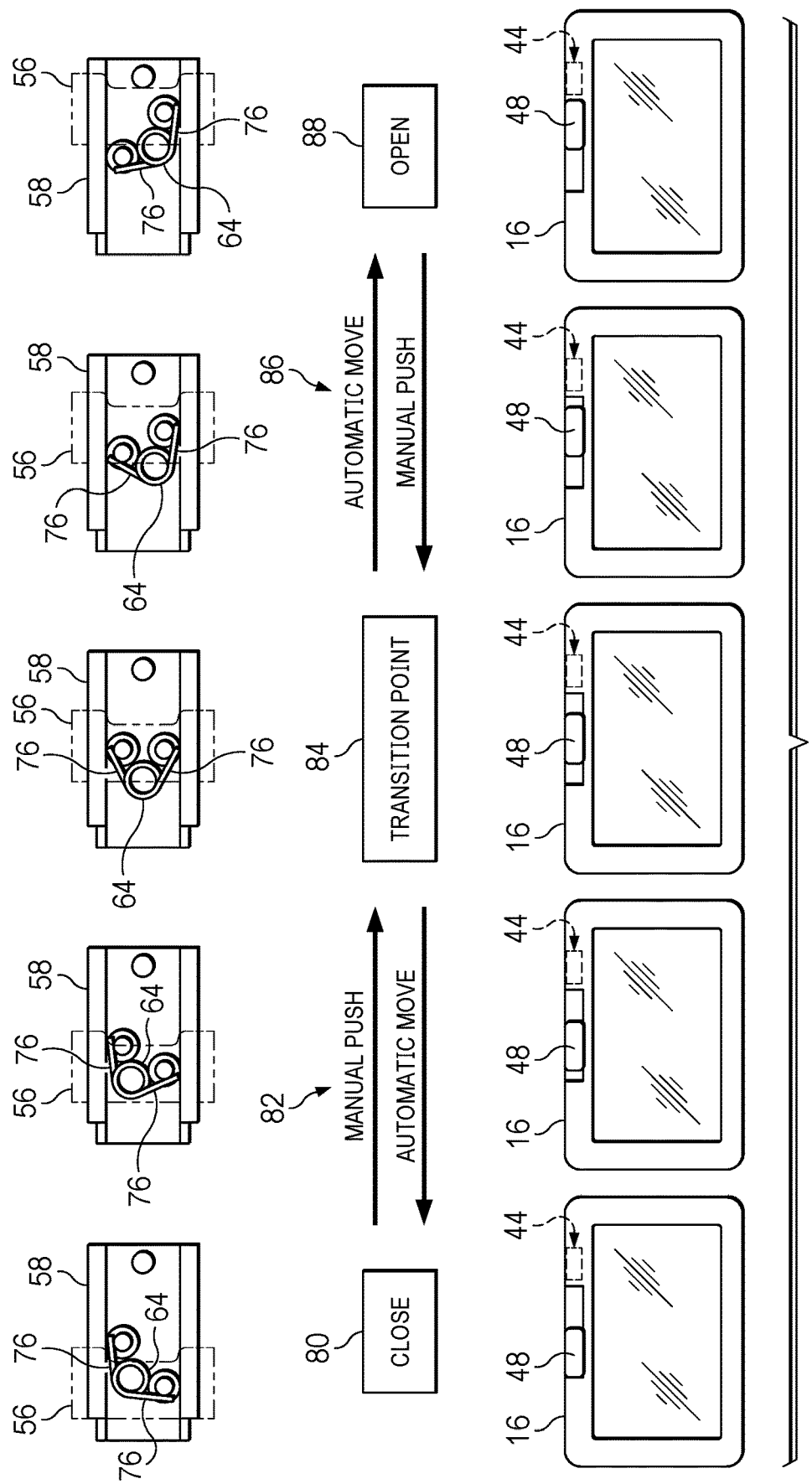
FIG. 5 depicts a flow diagram of movement of a camera shutter with dual bias to an open or closed position.

Referring now to FIG. 5, a flow diagram depicts movement of a camera shutter with dual bias to an open or closed position. The dual bias arrangement of torsion spring 64 within sliding portion 56 and fixed portion 58 generates a semi-automatic shutter movement response so that a shutter is biased to a fully open or closed position when pushed through a transition point 84. In closed position 80, extensions 76 from opposing sides of torsion spring 64 operate against the inner wall of fixed portion 58 so that tension in the spring works on sliding portion 56, such as the sliding portion fixed member, to bias sliding member 56 towards the closed position. From closed position 80, a manual push 82 on the shutter moves sliding portion 56 relative to fixed portion 58 towards transition point 84 with an increase in spring tension as the manual push operates against the bias towards the closed position 80. As sliding portion 56 reaches transition point 84, the tension on the spring is redirected by interaction with the fixed portion fixed member to push against the sliding portion member, resulting in a release of spring tension to perform an automated move 86 towards the open position 88.

The dual bias operates not just to move the shutter from the closed to the open position, but also from the open position 88 towards the closed position 80. From open position 88, a manual push towards transition point 84 builds tension in the single torsion spring as one extension 76 is compressed against the fixed portion fixed member until the transition point 84. Once sliding portion 56 reaches transition point 84, tension of torsion spring 64 is released to work on sliding portion 56 towards the closed position 80 with an automatic movement. The snap of the automatic movement towards both the closed position 80 and the open position 88 provides immediate feedback to an end user that a desired shutter position is securely set.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the instructions and information;
   a camera coupled to the housing and interfaced with the processor, the camera operable to capture visual images; and
   a shutter coupled to the housing, the shutter sliding between an open position that exposes the camera to capture the visual images and a closed position that blocks the camera from capture of the visual images, the shutter having a dual bias device that biases the shutter to the open position when the shutter is greater than a predetermined amount open and that biases the shutter to a closed position when the shutter is greater than a predetermined amount closed;
   wherein the dual bias device further comprises:
   a single spring;
   a sliding portion that slides relative to the housing, the sliding portion engaged with the spring to generate tension towards the open position when the shutter moves the predetermined amount open and to generate tension towards the closed position when the shutter moves the predetermined amount towards the closed position;
   a fixed portion slidingly coupled with the sliding portion and having a fixed portion fixed member positioned to engage with the single spring; and
   a sliding portion fixed member fixed to the sliding portion and positioned to engage with the single spring.

2. The information handling system of claim 1 wherein the single spring comprises a torsion spring having a first extension engaged with the fixed portion fixed member and a second extension engaged with the sliding portion fixed member.

3. The information handling system of claim 2 further comprising a limit post extending into the fixed portion to limit sliding motion of the sliding portion.

4. The information handling system of claim 2 wherein:
the fixed portion fixed member has a groove to engage the torsion spring first extension; and
the sliding portion fixed member has a groove to engage the torsion spring second extension.

5. The information handling system of claim 2 further comprising:
a rail extending from each side of the fixed portion; and
a guide formed on each side of the sliding portion, each guide engaged with the rail.

6. The information handling system of claim 2 further comprising a polyoxymethylene coating of the sliding portion.

7. The information handling system of claim 2 wherein the torsion spring comprises stainless steel.

8. A method for managing an information handling system camera shutter position, the method comprising:
coupling a sliding portion to a fixed portion to capture a torsion spring;
engaging a first extension of the torsion spring with a first member fixed to the fixed portion;
engaging the second extension with a second member fixed to the sliding portion;
when the shutter has a position of a predetermined amount closed, applying a biasing force on the shutter with the torsion spring towards the closed position; and
when the shutter has a position of a predetermined amount opened, applying a biasing force on the shutter with the torsion spring towards the open position.

9. The method of claim 8 further comprising:
applying the biasing towards the closed position and towards the open position with a single spring.

10. The method of claim 9 further comprising:
forming a groove in each of the first and second members;
engaging the first extension in the first member groove; and
engaging the second extension in the second member groove.

11. The method of claim 10 further comprising:
forming rails on each of opposing sides of the fixed portion; and
slidingly engaging a guide on each of opposing sides of the sliding portion with each of the rails.

12. The method of claim 11 wherein the torsion spring comprises a stainless steel spring.

13. A camera shutter comprising:
a shutter plate configured to selectively block a camera in a closed position and expose the camera in an open position; and
a dual bias device that biases the shutter plate to the open position when the shutter is greater than a predetermined amount open and that biases the shutter to a closed position when the shutter is greater than a predetermined amount closed;
wherein the dual bias device further comprises:
a single spring; and
a sliding portion that slides relative to the housing, the sliding portion engaged with the spring to generate tension towards the open position when the shutter moves the predetermined amount open and to generate tension towards the closed position when the shutter moves the predetermined amount towards the closed position;
a fixed portion slidingly coupled with the sliding portion and having a fixed portion fixed member positioned to engage with the single spring; and
a sliding portion fixed member fixed to the sliding portion and positioned to engage with the single spring;
wherein the single spring comprises a torsion spring having a first extension engaged with the fixed portion fixed member and a second extension engaged with the sliding portion fixed member.

14. The camera shutter of claim 13 wherein:
the fixed portion fixed member has a groove to engage the torsion spring first extension; and
the sliding portion fixed member has a groove to engage the torsion spring second extension.

* * * * *